(12) United States Patent
He et al.

(10) Patent No.: US 12,726,849 B2
(45) Date of Patent: Sep. 1, 2026

(54) LAYER-TWO ENHANCEMENTS FOR PDU SETS WITH DIFFERENT IMPORTANCE

(71) Applicant: QUALCOMM Incorporated, San Diego, CA (US)

(72) Inventors: Linhai He, San Diego, CA (US); Dario Serafino Tonesi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 317 days.

(21) Appl. No.: 18/425,246

(22) Filed: Jan. 29, 2024

(65) Prior Publication Data

US 2024/0259863 A1 Aug. 1, 2024

Related U.S. Application Data

(60) Provisional application No. 63/482,298, filed on Jan. 30, 2023.

(51) Int. Cl.
*H04W 28/02* (2009.01)
*H04W 72/0446* (2023.01)
(Continued)

(52) U.S. Cl.
CPC ... *H04W 28/0268* (2013.01); *H04W 28/0263* (2013.01); *H04W 72/0446* (2013.01);
(Continued)

(58) Field of Classification Search
CPC ......... H04W 28/0268; H04W 72/0446; H04W 72/0453; H04W 72/563; H04W 28/0263; H04W 72/569; H04W 80/02
See application file for complete search history.

(56) References Cited

U.S. PATENT DOCUMENTS

2006/0164981 A1* 7/2006 Olsson .................. H04L 1/1854 370/469
2016/0285716 A1* 9/2016 Pelletier ................ H04W 72/21
(Continued)

FOREIGN PATENT DOCUMENTS

WO WO-2015020344 A1 * 2/2015 ............ H04W 76/10
WO WO-2023061339 A1 * 4/2023 ........... H04L 5/0044
WO WO-2024139879 A1 * 7/2024 .......... H04W 72/569

OTHER PUBLICATIONS

Kwon, "Apparatus and Method for Transmitting Data in Heterogeneous Network Radio Communication System", Feb. 2, 2015, WO, WO 2015020344 (Year: 2015).*
(Continued)

*Primary Examiner* — Michael K Phillips
(74) *Attorney, Agent, or Firm* — Holland & Hart LLP

(57) ABSTRACT

Methods, systems, and devices for wireless communications are described. Generally, the described techniques provide for the establishment of an importance hierarchy for a quality of service (QOS) flow. A wireless device may associate various radio link control (RLC) entities and logical channels of the QoS flow with one or more importance levels of the QoS flow. In some cases, the wireless device may map each protocol data unit (PDU) set of the QoS flow to a respective importance level, which may influence transmission priority of the PDU sets. For example, a priority rule for scheduling PDUs may indicate that PDU sets are to be scheduled in order of importance, such that a PDU set associated with a highest importance level is scheduled first and a PDU set associated with a second-highest importance level is scheduled second.

30 Claims, 9 Drawing Sheets

(51) Int. Cl.

| | |
|---|---|
| ***H04W 72/0453*** | (2023.01) |
| ***H04W 72/563*** | (2023.01) |
| ***H04W 72/566*** | (2023.01) |
| ***H04W 80/02*** | (2009.01) |

(52) U.S. Cl.

CPC ..... *H04W 72/0453* (2013.01); *H04W 72/563* (2023.01); *H04W 72/569* (2023.01); *H04W 80/02* (2013.01)

(56) References Cited

U.S. PATENT DOCUMENTS

| | | | | |
|---|---|---|---|---|
| 2020/0128605 | A1* | 4/2020 | Tang | H04W 12/02 |
| 2020/0358570 | A1* | 11/2020 | Liu | H04W 80/02 |
| 2021/0258865 | A1* | 8/2021 | Park | H04W 48/16 |
| 2021/0282002 | A1* | 9/2021 | Sèbire | H04W 28/0268 |
| 2021/0399846 | A1* | 12/2021 | Kuo | H04W 72/569 |
| 2022/0376879 | A1* | 11/2022 | Li | H04L 1/1896 |
| 2025/0023964 | A1* | 1/2025 | Fu | H04L 65/80 |
| 2025/0119785 | A1* | 4/2025 | Rao | H04W 28/0236 |
| 2025/0142402 | A1* | 5/2025 | Fu | H04W 28/0263 |
| 2025/0344098 | A1* | 11/2025 | Xu | H04W 76/15 |

OTHER PUBLICATIONS

Zhao et al., "Information Processing Method and Apparatus, Transmission Method and Apparatus, Terminal and Network Side Device", Jul. 4, 2024, WO, WO 2024139879 (Year: 2024).*

Xu et al., "Data Transmission Method and Communication Apparatus", Apr. 20, 2023, WO, WO 2023061339 (Year: 2023).*

Apple: "Enhancements for Traffic Prioritization in XR", 3GPP TSG-RAN WG2 Meeting #120, R2-2211719, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 7 Pages, XP052215823, The Whole Document.

CMCC: "Consideration on PDU Discarding of XR Traffic", 3GPP TSG-RAN WG2 Meeting #119bis-e, R2-2210506, 3rd Generation Partnership Project, Mobile Competence Centre, 650, Route Des Lucioles, F-06921 Sophia-Antipolis Cedex, France, vol. RAN WG2, No. Electronic meeting, Oct. 10, 2022-Oct. 19, 2022, Sep. 30, 2022, 5 Pages, XP052263820, p. 1-p. 2, figure 1.

International Search Report and Written Opinion—PCT/US2024/013504—ISA/EPO—May 21, 2024.

Korhonen J (Vice Chairman (Nokia))., et al., "Report on LTE Legacy, DCCA, MUSIM, Slicing, 71 GHz, XR and QoE", 3GPP TSG-RAN WG2 Meeting #120, R2-2213002, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 18, 2022, 57 Pages, XP052228398, p. 4-p. 10, figures 1-2.

Li X (Xiaomi Communications)., et al., "Discussion on QoS Support with PDU Set Granularity", 3GPP TSG-RAN2 Meeting #120, R2-2211584, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 6 Pages, XP052215689, p. 1, 4-p. 5, figure 1.

* cited by examiner

500

Figure 9:
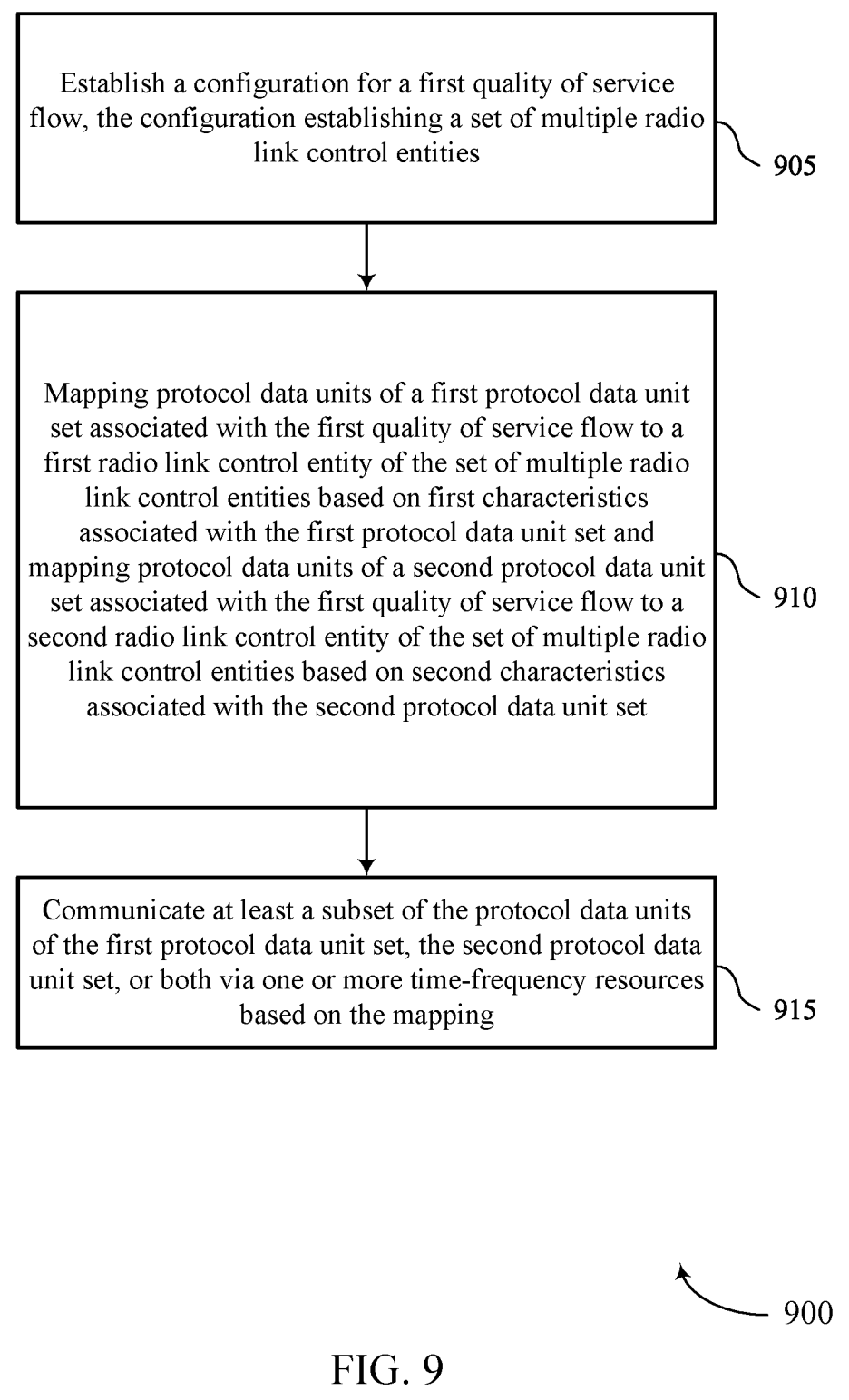

Establish a configuration for a first quality of service flow, the configuration establishing a set of multiple radio link control entities

905

Mapping protocol data units of a first protocol data unit set associated with the first quality of service flow to a first radio link control entity of the set of multiple radio link control entities based on first characteristics associated with the first protocol data unit set and mapping protocol data units of a second protocol data unit set associated with the first quality of service flow to a second radio link control entity of the set of multiple radio link control entities based on second characteristics associated with the second protocol data unit set

910

Communicate at least a subset of the protocol data units of the first protocol data unit set, the second protocol data unit set, or both via one or more time-frequency resources based on the mapping

LAYER-TWO ENHANCEMENTS FOR PDU SETS WITH DIFFERENT IMPORTANCE

CROSS REFERENCE

The present Application for Patent claims the benefit of U.S. Provisional Patent Application No. 63/482,298 by H E et al., entitled "LAYER-TWO ENHANCEMENTS FOR PDU SETS WITH DIFFERENT IMPORTANCE," filed Jan. 30, 2023, assigned to the assignee hereof, and expressly incorporated by reference herein.

FIELD OF TECHNOLOGY

The following relates to wireless communications, including layer-two (L2) enhancements for protocol data unit (PDU) sets with different importance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communicating data in one or more PDUs (PDUs). In some cases, PDUs may be aggregated in a PDU set, and multiple PDU sets may be associated with a same application (e.g., each PDU set may correspond to a video frame for a video playback). Different PDU sets may have different decoding criteria, which may depend on application layer characteristics such as error correction. Managing transmission characteristics of different PDU sets associated with an application may present challenges in matching the transmission characteristics to the implementation of the PDU sets in the application.

SUMMARY

The described techniques relate to improved methods, systems, devices, and apparatuses that support layer-two (L2) enhancements for protocol data unit (PDU) sets with different characteristics (e.g., importance). For example, the described techniques provide for the establishment of an importance hierarchy for a quality of service (QOS) flow. A wireless device may associate various radio link control (RLC) entities and logical channels of the QoS flow with one or more importance levels of the QoS flow. In some cases, the wireless device may configure each RLC entity with a respective set of RLC parameters (e.g., one or more RLC timers) and may configure each logical channel with a common set of parameters or with respective sets of parameters. The wireless device may map each PDU set of the QoS flow to a respective importance level, which may influence transmission priority of the PDU sets. For example, a priority rule for scheduling PDUs may indicate that PDU sets are to be scheduled in order of importance (e.g., a PDU set associated with a highest importance level scheduled first, a PDU set associated with a second-highest importance level scheduled second, and so on).

A method for wireless communication by a user equipment (UE) is described. The method may include establishing a configuration for a first QoS flow, the configuration establishing a set of multiple RLC entities, mapping PDUs of a first PDU set associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics associated with the second PDU set, and communicating at least a subset of the PDUs of the first PDU set, the second PDU set, or both via one or more time-frequency resources based on the mapping.

A UE for wireless communication is described. The UE may include one or more memories storing processor executable code, and one or more processors coupled with the one or more memories. The one or more processors may individually or collectively operable to execute the code to cause the UE to establish a configuration for a first QoS flow, the configuration establishing a set of multiple RLC entities, map PDUs of a first PDU set associated with the first QoS flow to a first RLC entity of the set of multiple RLC entities based on first characteristics associated with the first PDU set and map PDUs of a second PDU set associated with the first QoS flow to a second RLC entity of the set of multiple RLC entities based on second characteristics associated with the second PDU set, and communicate at least a subset of the PDUs of the first PDU set, the second PDU set, or both via one or more time-frequency resources based on the mapping.

Another UE for wireless communication is described. The UE may include means for establishing a configuration for a first QoS flow, the configuration establishing a set of multiple RLC entities, means for mapping PDUs of a first PDU set associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics associated with the second PDU set, and means for communicating at least a subset of the PDUs of the first PDU set, the second PDU set, or both via one or more time-frequency resources based on the mapping.

A non-transitory computer-readable medium storing code for wireless communication at a wireless device is described. The code may include instructions executable by one or more processors to establish a configuration for a first QoS flow, the configuration establishing a set of multiple RLC entities, map PDUs of a first PDU set associated with the first QoS flow to a first RLC entity of the set of multiple RLC entities based on first characteristics associated with the first PDU set and map PDUs of a second PDU set associated with the first QoS flow to a second RLC entity of the set of multiple RLC entities based on second characteristics associated with the second PDU set, and communicate at least a subset of the PDUs of the first PDU set, the second PDU set, or both via one or more time-frequency resources based on the mapping.

In some examples of the method, apparatuses, and non-transitory computer-readable medium described herein, the first RLC entity may be associated with a first logical channel of a set of multiple logical channels and the second RLC entity may be associated with a second logical channel of the set of multiple logical channels, the set of multiple logical channels associated with the first QoS flow.

Some examples of the method, UEs, and non-transitory computer-readable medium described herein may further include operations, features, means, or instructions for mapping the PDUs of the first PDU set to a first subset of the one or more time-frequency resources based on a first logical channel prioritization (LCP) restriction policy associated with the first logical channel and mapping the PDUs of the second PDU set to a second subset of the one or more time-frequency resources based on a second LCP restriction policy associated with the second logical channel.

In some examples of the method, UEs, and non-transitory computer-readable medium described herein, the first logical channel may be associated with a first LCP priority and the second logical channel may be associated with a second LCP priority.

In some examples of the method, UEs, and non-transitory computer-readable medium described herein, the first logical channel and the second logical channel may be associated with a first LCP parameter, the first LCP parameter based on one or more characteristics of the first QoS flow.

In some examples of the method, UEs, and non-transitory computer-readable medium described herein, the first LCP parameter includes a first prioritized bit rate (PBR), a first bucket size duration (BSD), or both.

Some examples of the method, UEs, and non-transitory computer-readable medium described herein may further include operations, features, means, or instructions for decrementing a state variable that may be associated with the set of multiple logical channels based on communicating at least the subset of the PDUs of the first PDU set, the second PDU set, or both.

In some examples of the method, UEs, and non-transitory computer-readable medium described herein, the first logical channel may be associated with a first LCP parameter and the second logical channel may be associated with a second LCP parameter and the first LCP parameter, the second LCP parameter, or both may be based on one or more characteristics of the first QoS flow.

In some examples of the method, UEs, and non-transitory computer-readable medium described herein, the first LCP parameter includes a first PBR, a first BSD, or both and the second LCP parameter includes a second PBR, a second BSD, or both.

In some examples of the method, UEs, and non-transitory computer-readable medium described herein, the first QoS flow, the first RLC entity, the second RLC entity, the first logical channel, and the second logical channel, may be associated with a same data radio bearer.

In some examples of the method, apparatuses, and non-transitory computer-readable medium described herein, the third RLC entity may be associated with a third logical channel and the first logical channel and the third logical channel may be associated with a first LCP parameter.

In some examples of the method, apparatuses, and non-transitory computer-readable medium described herein, the first RLC entity and the second RLC entity may be associated with a first logical channel of a set of multiple logical channels, the set of multiple logical channels associated with the first QoS flow.

In some examples of the method, UEs, and non-transitory computer-readable medium described herein, the set of multiple RLC entities may be associated with respective importance levels of a plurality of importance levels associated with the first QoS flow, the first characteristics associated with the first PDU set may indicate that the first PDU set is associated with a first importance level of the set of multiple importance levels, and the second characteristics associated with the second PDU set may indicate that the second PDU set is associated with a second importance level of the set of multiple importance levels.

Some examples of the method, UEs, and non-transitory computer-readable medium described herein may further include operations, features, means, or instructions for establishing the configuration for the first QoS flow includes establishing a third RLC entity of the set of multiple RLC entities based on the first importance level being selected for duplication of one or more PDUs; and the method further includes, duplicating the PDUs of the first PDU set, and mapping the duplicated PDUs of the first PDU set to the third RLC entity.

Some examples of the method, UEs, and non-transitory computer-readable medium described herein may further include operations, features, means, or instructions for scheduling one or more first PDUs of the first PDU set for transmission via the one or more time-frequency resources and scheduling, after scheduling the one or more first PDUs, one or more second PDUs of the second PDU set for transmission via the one or more time-frequency resources, where the one or more second PDUs may be scheduled after the one or more first PDUs based on the first importance level being higher than the second importance level.

In some examples of the method, UEs, and non-transitory computer-readable medium described herein, communicating at least the subset of the PDUs of the first PDU set, the second PDU set, or both may include operations, features, means, or instructions for dropping one or more first PDUs of the first PDU set based on the second importance level being higher than the first importance level and dropping one or more second PDUs of the second PDU set based on the first importance level being higher than the second importance level.

In some examples of the method, UEs, and non-transitory computer-readable medium described herein, each RLC entity of the set of multiple RLC entities may be associated with a respective set of RLC parameters of a set of multiple sets of RLC parameters.

In some examples of the method, UEs, and non-transitory computer-readable medium described herein, each RLC entity of the set of multiple RLC entities may be associated with a respective segmentation buffer and a respective reassembly buffer.

BRIEF DESCRIPTION OF THE DRAWINGS

FIG. 9 illustrates a flowchart showing methods that support L2 enhancements for PDU sets with different importance in accordance with one or more aspects of the present disclosure.

DETAILED DESCRIPTION

Figure 1:
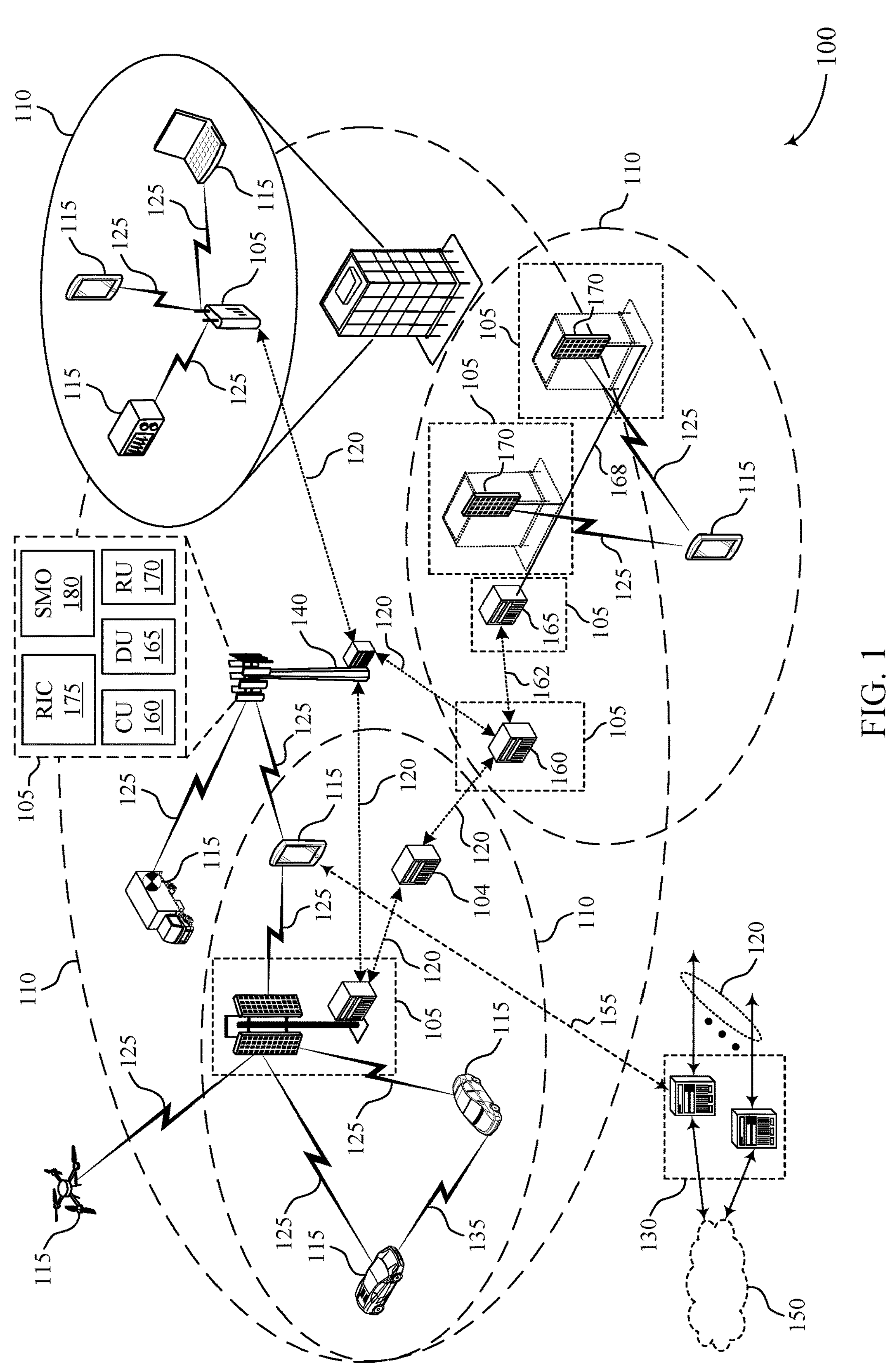
FIG. 1 illustrates an example of a wireless communications system that supports layer-two (L2) enhancements for protocol data unit (PDU) sets with different importance in accordance with one or more aspects of the present disclosure.

In some wireless communications systems, wireless devices may communicate one or more protocol data units (PDUs) to support various applications or services. In some cases, such as when performing services associated with relatively large amounts of data, multiple PDUs may be aggregated into a PDU set. For example, a PDU set may be communicated to support playback of a video frame or a slice within a video frame. As applications increase in complexity and utilize greater quantities of PDUs (e.g., virtual reality (VR) services, augmented reality (AR) services, or the like), multiple PDU sets may be associated with an application. For example, the multiple PDU sets may be associated with a same quality of service (QOS) flow (e.g., a QoS flow configured for the application) and may share common QoS attributes, such as a PDU set delay budget (PSDB), a PDU set error rate (PSER), or both. In some examples, a decoding criteria may stipulate various dependencies for decoding PDUs of a PDU set, such as flagging a PDU set as obsolete if at least one PDU of the PDU set is lost, or refraining from communicating remaining PDUs of a PDU set upon a first unsuccessful reception of a PDU of the PDU set. However, some PDU sets of the QoS flow may be more important than other PDU sets of the QoS flow (e.g., a first PDU set may be dependent on a second PDU set being successfully communicated). In some cases, a wireless device may establish an importance hierarchy within a same QoS flow for PDU sets of the QoS to avoid dropping a PDU set that has a greater importance than one or more other PDU sets, which may improve communication reliability in the presence of channel congestion.

To support the establishment of a hierarchy for a QoS flow, a wireless device may associate various radio link control (RLC) entities and logical channels of the QoS flow with one or more characteristics (e.g., importance levels) of the QoS flow. For example, each characteristic may be associated with a respective RLC entity and a respective logical channel (a one-to-one association), or may be associated with a respective RLC entity and a common logical channel (a many-to-one association). In some cases, the wireless device may configure each RLC entity with a respective set of RLC parameters (e.g., one or more RLC timers) and may configure each logical channel with a common set of parameters or with respective sets of parameters. The wireless device may map each PDU set of the QoS flow to a respective one of a set of characteristics, which may influence transmission priority of the PDU sets. For example, a priority rule for scheduling PDUs may indicate that PDU sets are to be scheduled in order of importance (e.g., a PDU set associated with a highest importance level scheduled first, a PDU set associated with a second-highest importance level scheduled second, and so on). Such techniques may improve a reliability of communicating data for an application by reducing a likelihood that one or more important PDUs of the application are dropped.

Aspects of the disclosure are initially described in the context of wireless communications systems. Aspects of the disclosure are further illustrated by and described with reference to mapping structures and a process flow. Aspects of the disclosure are further illustrated by and described with reference to apparatus diagrams, system diagrams, and flowcharts that relate to layer-two (L2) enhancements for PDU sets with different importance.

FIG. 1 illustrates an example of a wireless communications system 100 that supports L2 enhancements for PDU sets with different importance in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., RLC layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-*u*), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support L2 enhancements for PDU sets with different importance as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some wireless communications systems, such as the wireless communications system 100, wireless devices (e.g., a UE 115 or a network entity 105) may communicate one or more protocol data unit (PDU) sets to support various applications or services. As applications increase in complexity and utilize greater quantities of PDUs, multiple PDU sets may be associated with a same quality-of-service (QoS) flow (e.g., a QoS flow configured for the application) and may share common QoS attributes (e.g., a PDU set delay budget (PSDB) or a PDU set error rate (PSER)). In some examples, a decoding criteria may stipulate various dependencies for decoding PDUs of a PDU set, such as flagging a PDU set as obsolete if at least one PDU of the PDU set is lost, or refraining from communicating remaining PDUs of a PDU set upon a first unsuccessful reception of a PDU of the PDU set. However, some PDU sets of the QoS flow may be more important than other PDU sets of the QoS flow (e.g., a first PDU set may be dependent on a second PDU set being successfully communicated). In some cases, a wireless device may establish an importance hierarchy within a same Qos flow for PDU sets of the QoS to avoid dropping a PDU set that has a greater importance than one or more other PDU sets, which may improve communication reliability in the presence of channel congestion.

To support the establishment of a hierarchy for a QoS flow, a wireless device may associate various RLC entities and logical channels of the QoS flow with one or more characteristics of the QoS flow. For example, each characteristic may be associated with a respective RLC entity and a respective logical channel (a one-to-one association), or may be associated with a respective RLC entity and a common logical channel (a many-to-one association). The wireless device may map each PDU set of the QoS flow to a respective one of a set of characteristics, which may influence transmission priority of the PDU sets. For example, a priority rule for scheduling PDUs may indicate that PDU sets are to be scheduled in order of importance (e.g., a PDU set associated with a highest importance level scheduled first, a PDU set associated with a second-highest importance level scheduled second, and so on). Such techniques may improve a reliability of communicating data for an application by reducing a likelihood that one or more important PDUs of the application are dropped.

Figure 2:
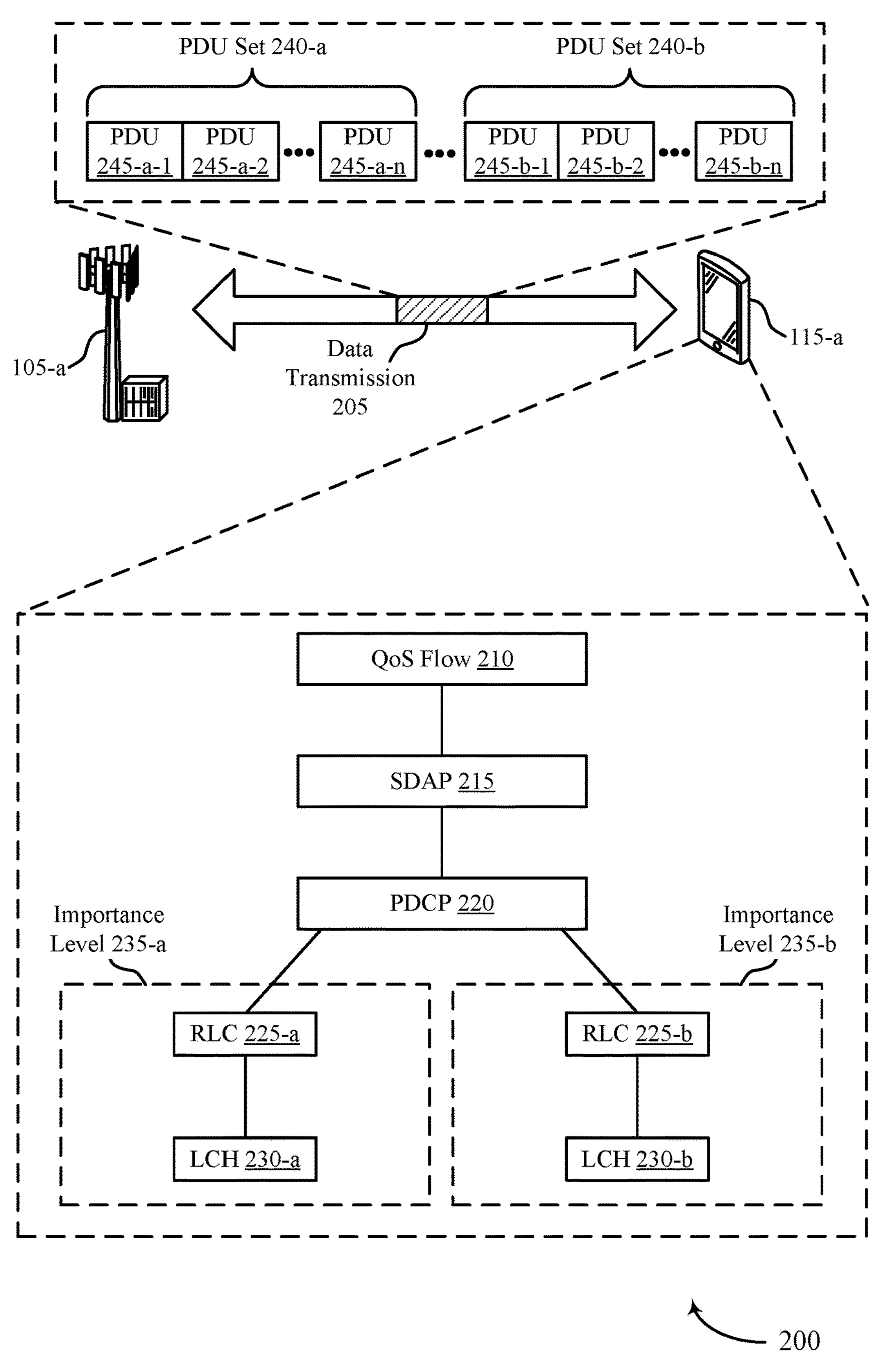
FIG. 2 illustrates an example of a wireless communications system that supports L2 enhancements for PDU sets with different importance in accordance with one or more aspects of the present disclosure.

FIG. 2 illustrates an example of a wireless communications system 200 that supports L2 enhancements for PDU sets with different importance in accordance with one or more aspects of the present disclosure. The wireless communications system 200 may implement one or more aspects of the wireless communications system 100. For example, the wireless communications system 200 may include a network entity 105-*a* and a UE 115-*a*, which may be examples of corresponding devices described with reference to FIG. 1. The wireless communications system 200 may include a data transmission 205 that is communicated between the network entity 105-*a* and the UE 115-*a*. The data transmission 205 may be associated with a QoS flow 210, which may include upper protocol layer functionality and signaling, such as SDAP 215 and PDCP 220, which may be examples of corresponding features described with reference to FIG. 1. For example, the QoS flow 210 may be associated with (e.g., assigned to) a data radio bearer (DRB) of the wireless communications system 200 according to a DRB mapping via the SDAP 215. Additionally, or alternatively, the DRB associated with the QoS flow 210 may be associated with one or more aspects of the QoS flow 210, such as importance levels 235, RLC entities 225, logical channels 230, or a combination thereof. For example, a network device may establish a DRB and assign the QoS flow 210 to the DRB, which may result in the RLC entities 225 and the logical channels 230 of the QoS flow 210 being associated with the DRB (e.g., a same DRB). In some examples, one or more other QoS flows (e.g., associated with respective sets of importance levels) may be multiplexed with the QoS flow 210 and assigned to the same DRB via the SDAP 215. In some examples, data packets (e.g., service data units (SDUs)) may have a PDCP header added (e.g., for a transmitting PDCP entity) or may have a PDCP header removed (e.g., for a receiving PDCP entity) via the PDCP 220.

In some examples, the data transmission 205 may include multiple PDU sets 240 (e.g., a PDU set 240-*a* and a PDU set 240-*b*) to communicate data associated with an application or service. A PDU set 240 may include one or more PDUs 245 which share common QoS attributes (e.g., a PDU set delay budget (PSDB), a PDU set error rate (PSER), or both). For example, the PDU set 240-*a* may include a PDU 245-*a*-1, a PDU 245-*a*-2, and one or more additional PDUs 245-*a* (e.g., for a quantity of n PDUs 245-*a*, depicted by a PDU 245-*a*-*n*), and the PDU set 240-*b* may include a PDU 245-*b*-1, a PDU 245-*b*-2, and one or more additional PDUs 245-*b* (e.g., for a quantity of n PDUs 245-*b*, depicted by a PDU 245-*b*-*n*). Additionally, or alternatively, PDU sets 240 that are associated with a same application may share common QoS attributes, such as a PSDB, a PSER, a priority, a guaranteed bit rate (GBR), a maximum data burst volume (MDBV), or a combination thereof. In some cases, a wireless device (e.g., the network entity 150-*a* or the UE 115-*a*) may communicate a PDU set 240 as an integrated unit of the application. As an example, a PDU set 240 may include multiple PDUs 245 which are each associated with a video frame or a slice of a video frame of the application.

The PDU set 240-*a* and the PDU set 240-*b* may be associated with various decoding criteria (e.g., according to a PDU set integrated indication) based on an implementation of the application associated with the PDU sets 240. For example, the decoding criteria may indicate that if at least one PDU 245 of a PDU set 240 is unsuccessfully communicated, the PDU set 240 is considered obsolete (e.g., an all or nothing criteria). As another example, the decoding criteria may indicate to refrain from communicating remaining PDUs 245 of a PDU set 240 upon a first unsuccessfully communicated PDU 245 of the PDU set 240 (e.g., a good until the first loss criteria). In some cases, the decoding criteria may relate to an application layer (AL)-forward error correction (FEC) encoding process such that a subset of PDUs 245 of a PDU set 240 may be utilized for decoding the PDU set 240 (e.g., where a quantity PDUs of the subset of PDUs 245 depends on a redundancy ratio of the FEC).

In some cases, PDU sets 240 that are associated with a same application may have differing levels of importance for the application (e.g., importance may be a respective characteristic of each PDU set 240). For example, data associated with the PDU set 240-*b* may be dependent on successful communication of data associated with the PDU set 240-*a*, which may indicate that the PDU set 240-*a* has a greater importance than the PDU set 240-*b*. In some examples, multiple importance levels 235 may be configured within a same QoS flow (e.g., the QoS flow 210) and PDU sets 240 of the QoS flow may be associated with respective ones of the multiple importance levels 235. For example, the QoS flow 210 may include an importance level 235-*a* and an importance level 235-*b*, and a wireless device may map the PDU set 240-*a* to the importance level 235-*a* and may map the PDU set 240-*b* to the importance level 235-*b*. In some cases, the PDU set 240-*a* may have a greater communication reliability than the PDU set 240-*b* due to the importance level 235-*a* being higher than the importance level 235-*b*. For example, in the presence of channel congestion, a transmitting device may discard the PDU set 240-*b* before discarding the PDU set 240-*a* according to the importance level 235-*a* and the importance level 235-*b*. As another example, the transmitting device may schedule the PDU set 240-*a* for transmission before scheduling the PDU set 240-*b* for transmission, which may increase a likelihood that the PDUs 245-*a* of the PDU set 240-*a* are communicated within a delivery deadline. It should be noted that the QoS flow 210 may include any quantity of importance levels 235, and is not limited to the two importance levels 235 depicted in FIG. 2.

In some examples, a wireless device (e.g., the network entity 105-*a* or the UE 115-*a*) may associate the importance levels 235 with respective RLC entities 225 of the QoS flow 210. For example, the wireless device may configure the importance level 235-*a* and the importance level 235-*b* with an RLC entity 225-*a* and an RLC entity 225-*b*, respectively (e.g., forming RLC branches within the QoS flow 210). Additionally, or alternatively, the wireless device may configure the importance levels 235 with one or more logical channels 230. For example, a logical channel 230-*a* may be mapped to the importance level 235-*a* and a logical channel 230-*b* may be mapped to the importance level 235-*b* (e.g., a one-to-one mapping between importance levels 235 and logical channels 230, as depicted in FIG. 2). In another example, each of the importance levels 235 may share a common logical channel 230 as described further with reference to FIG. 3B.

In some cases, each RLC entity 225 may be associated with a respective set of RLC parameters for communicating PDU sets 240. Such parameters may include an assembly timer indicating a duration for communicating each PDU 245 of a PDU set 240 (e.g., t-assembly), one or more timers associated with a timing for feedback communications (e.g., t-StatusProhibit, t-PollRetransmit, and t-pollByte), or a combination thereof, and may be set according to an associated importance level 235. For example, the RLC entity 225-*a* may be configured with a longer assembly timer (e.g., to reduce a likelihood a PDU 245 of a PDU set 240 is discarded) and shorter feedback timers (e.g., to increase a periodicity of feedback communications) than the RLC entity 225-*b* due to the importance level 235-*a* being higher than the importance level 235-*b*. Additionally, or alternatively, each RLC entity 225 may be associated with a respective segmentation buffer (e.g., an uplink buffer), a respective reassembly buffer (e.g., a downlink buffer), or both.

In some examples, such as when each importance level 235 is associated with a respective logical channel 230, a wireless device may configure each logical channel 230 with a respective logical channel prioritization (LCP) restriction policy. An LCP restriction policy may indicate one or more carriers to use for communicating PDUs 245 of a PDU set 240 that is mapped to a logical channel 230. For example, the LCP restriction policy of the logical channel 230-*a* may indicate to transmit PDUs 245-*a* of the PDU set 240-*a* via low-band carriers according to the importance level 235-*a*, which may support a greater communication reliability. In some examples, the wireless device may configure the logical channel 230-*a* and the logical channel 230-*b* with a same priority level (e.g., a priority configured for the QoS flow 210) or different priority levels for scheduling PDU sets 240.

In a first example, each logical channel 230 of the QoS flow 210 may share a common set of LCP parameters that correspond to one or more characteristics of the QoS flow 210. For instance, the logical channel 230-*a* and the logical channel 230-*b* may be associated with a common prioritized bit rate (PBR), a common bucket size duration (BSD), or both, which may be based on the one or more characteristics of the QoS flow 210, such as a GBR and MDBV of the QoS flow 210. Additionally, or alternatively, the logical channel 230-*a* and the logical channel 230-*b* may share a common state variable (e.g., $B_j$) for performing an LCP procedure to schedule one or more PDUs 245 according to the LCP restriction policies of the logical channel 230-*a* and the logical channel 230-*b*. For example, the common state variable may be incremented (e.g., according to a function of the common PBR) during the LCP procedure for both the logical channel 230-*a* and the logical channel 230-*b*. As part of the LCP procedure, a wireless device may, upon receiving a resource grant (e.g., the UE 115-*a* receiving an uplink grant from the network entity 105-*a*), determine how to allocate resources indicated by the resource grant to PDU sets 240 associated with different logical channels 230.

In some cases, the wireless device may schedule PDU sets 240 according to a priority rule that is based on the importance levels 235. For example, the wireless device may schedule the PDUs 245-*a* of the PDU set 240-*a* for transmission via one or more resources indicated in the resource grant, and may schedule the PDUs 245-*b* of the PDU set 240-*b* for transmission via one or more remaining resources indicated in the resource grant after scheduling the PDU set 240-*a* due to the importance level 235-*a* being higher than the importance level 235-*b*. In some other examples, the wireless device (e.g., the network entity 105-*a* or the UE 115-*a*) may determine how much data from each importance level 235 to allocate to fill the resource grant and may determine an order for multiplexing data into the resource grant. In some cases, the wireless device may include PDUs 245 from different RLC entities 225 (e.g., PDUs 245-*a* from the RLC entity 225-*a* and PDUs 245-*b* from the RLC entity 225-*b*) in different MAC sub-PDUs. After filling the resource grant, the wireless device may decrement the common state variable (e.g., $B_j$) according to a total amount of data scheduled for the resource grant across each of the RLC entities 225 (e.g., associated with each of the logical channels 230).

In a second example, a first wireless device (e.g., a network device such as a RAN node or the network entity 105-*a*) may configure a respective set of LCP parameters for each logical channel 230. For example, the first wireless device may identify one or more characteristics of the QoS flow 210 (e.g., a GBR and MDBV provided by a core network) and may determine a respective PBR, a respective BSD, or both, for each logical channel 230 according to the importance level 235 associated with each logical channel 230. In some cases, a second wireless device may receive a resource grant (e.g., the UE 115-*a* receiving an uplink grant), and may perform an LCP procedure according to the LCP restriction policy of the logical channel 230-*a*, the logical channel 230-*b*, or both. For example, the logical channel 230-*a* may perform the LCP procedure using a first state variable and the logical channel 230-*b* may perform the LCP procedure using a second state variable.

Figure 3A:
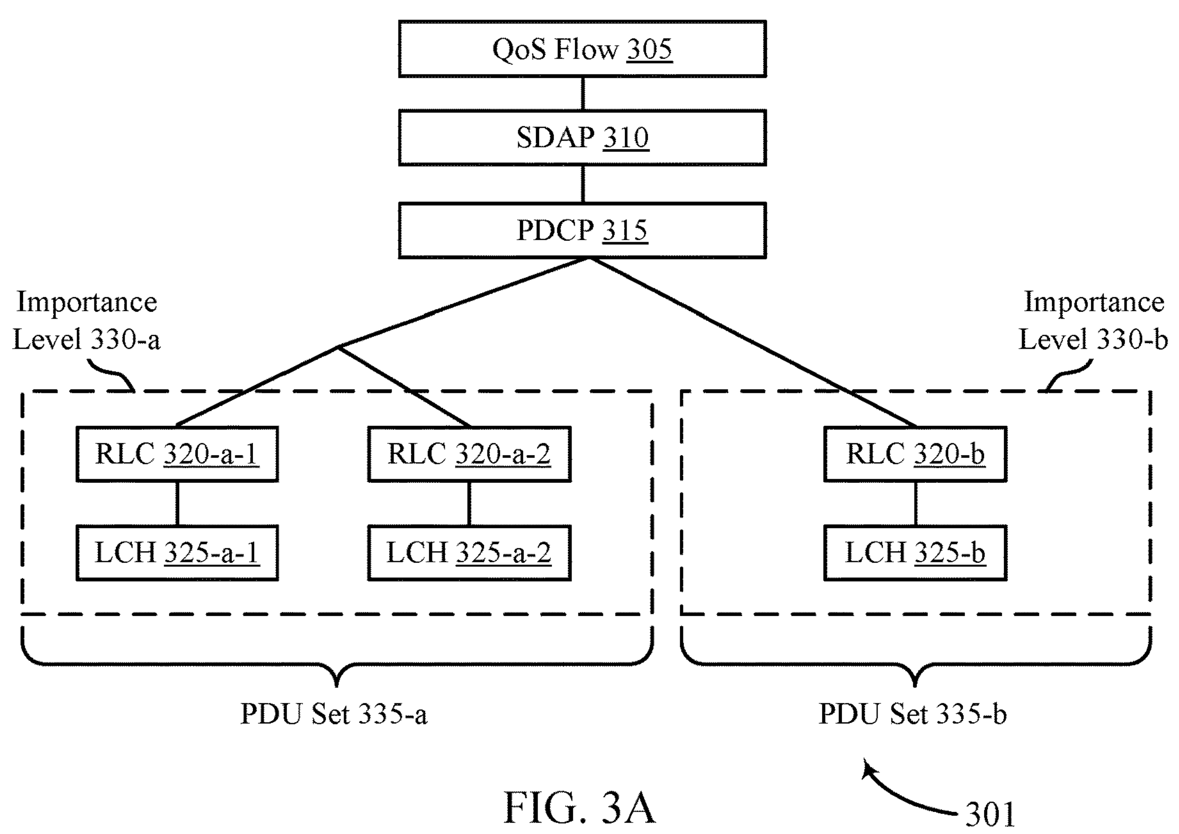
FIGS. 3A & 3B illustrate examples of mapping structures that support L2 enhancements for PDU sets with different importance in accordance with one or more aspects of the present disclosure.
Figure 3B:
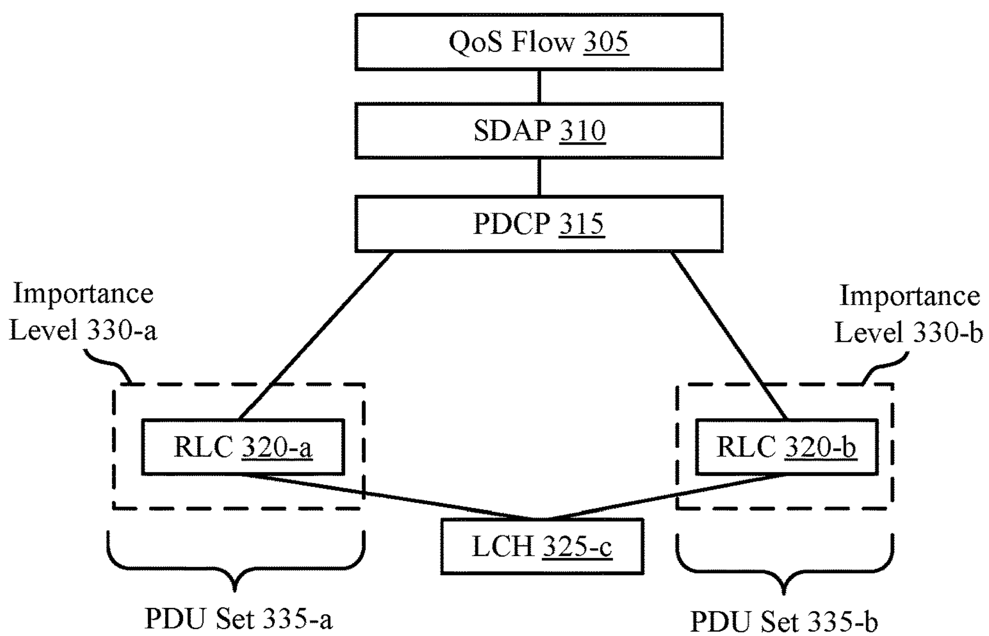

FIGS. 3A & 3B illustrate examples of a mapping structure 301 and a mapping structure 302, respectively, that support L2 enhancements for PDU sets with different importance in accordance with one or more aspects of the present disclosure. The mapping structure 301 and the mapping structure 302 may implement one or more aspects of the wireless communications system 200. For example, the mapping structure 301 and the mapping structure 302 may include a QoS flow 305, an SDAP 310, a PDCP 315, one or more RLC entities 320, one or more logical channels 325, and one or more importance levels 330, which may be respective examples of corresponding features as described with reference to FIG. 2.

FIG. 3A depicts the mapping structure 301, which may be an example of selective duplication of one or more PDU sets 335 according to an importance level 330. For example, a network device (e.g., a RAN node, a network entity 105, or the like) may select the importance level 330-*a* and may configure the importance level 330-*a* for PDCP duplication. In some examples, PDCP duplication may support data packets of a PDU set 335 being duplicated between multiple RLC entities 320 associated with a same DRB. For example, if the importance level 330-*a* is configured for PDCP duplication, a wireless device may map a PDU set 335-*a* that is associated with the importance level 330-*a* to both an RLC entity 320-*a*-1 and an RLC entity 320-*a*-2. The RLC entity 320-*a* 1 and the RLC entity 320-*a*-2 may be associated with different physical channels such as different component carriers or connection entities (e.g., in a dual-connectivity arrangement). Additionally, the wireless device may schedule the PDU set 335-*a* twice according to both of a logical channel 325-*a*-1 and a logical channel 325-*a*-2 (e.g., using an LCP restriction policy of the logical channel 325-*a*-1 and the logical channel 325-*a*-2). In some cases, the network device may not configure PDCP duplication for the importance level 330-*b*, and a PDU set 335-*b* may be mapped and scheduled according to a single RLC entity 320-*b* and a single logical channel 325-*b*. In some examples, such as when each logical channel 325 of the QoS flow 305 share a common set of LCP parameters, the network device may refrain from configuring the selective duplication for importance levels 330 of the QoS flow 305 (e.g., setting the shared parameters may be unclear). In some other examples, such as when each logical channel 325 of the QoS flow 305 corresponds to a respective set of LCP parameters, the network device may configure the selective duplication for one or more importance levels 330 of the QoS flow.

FIG. 3B depicts the mapping structure 302, which may be an example of one or more RLC entities 320 sharing a common logical channel 325. For example, the RLC entity 320-*a* and the RLC entity 320-*b* may be associated with different importance levels 330 (e.g., the importance level 330-*a* and the importance level 330-*b*, respectively, which may be examples of characteristics of a PDU set) and may each be associated with a logical channel 325-*c* (e.g., a shared logical channel 325). In some examples, the RLC entity 320-*a* and the RLC entity 320-*b* may be associated with respective sets of RLC parameters (e.g., RLC timing parameters described with reference to FIG. 2). The logical channel 325-*c* may correspond to a set of LCP parameters, such as PBR and BSD, based on one or more characteristics of the QoS flow 305, such as GBR and MDVB. Additionally, or alternatively, the PDU set 335-*a* and the PDU set 335-*b* may share the common logical channel 325. For example, an LCP restriction policy of the logical channel 325-*c* and a common state variable may be used during an LCP procedure for scheduling data packets of both a first characteristic of a PDU set 335-*a* (e.g., indicating that the PDU set 335-*a* is associated with the importance level 330-*a*) and a second characteristics of a second PDU set 335-*b* (e.g., indicating that the PDU set 335-*b* is associated with the importance level 330-*b*). In some cases, a wireless device may follow a priority rule for scheduling PDU sets 335 (e.g., PDU sets 335 associated with a higher importance level 330 are scheduled first), or the wireless device may determine how much data from each importance level 330 is to be multiplexed for transmission. For example, the wireless device may multiplex PDU sets 335 of different RLC entities 320 (e.g., the PDU set 335-*a* of the RLC entity 320-*a* and the PDU set 335-*b* of the RLC entity 320-*b*) into a same MAC sub-PDU due to each PDU set 335 being associated with the common logical channel 325-*c*.

Figure 4:
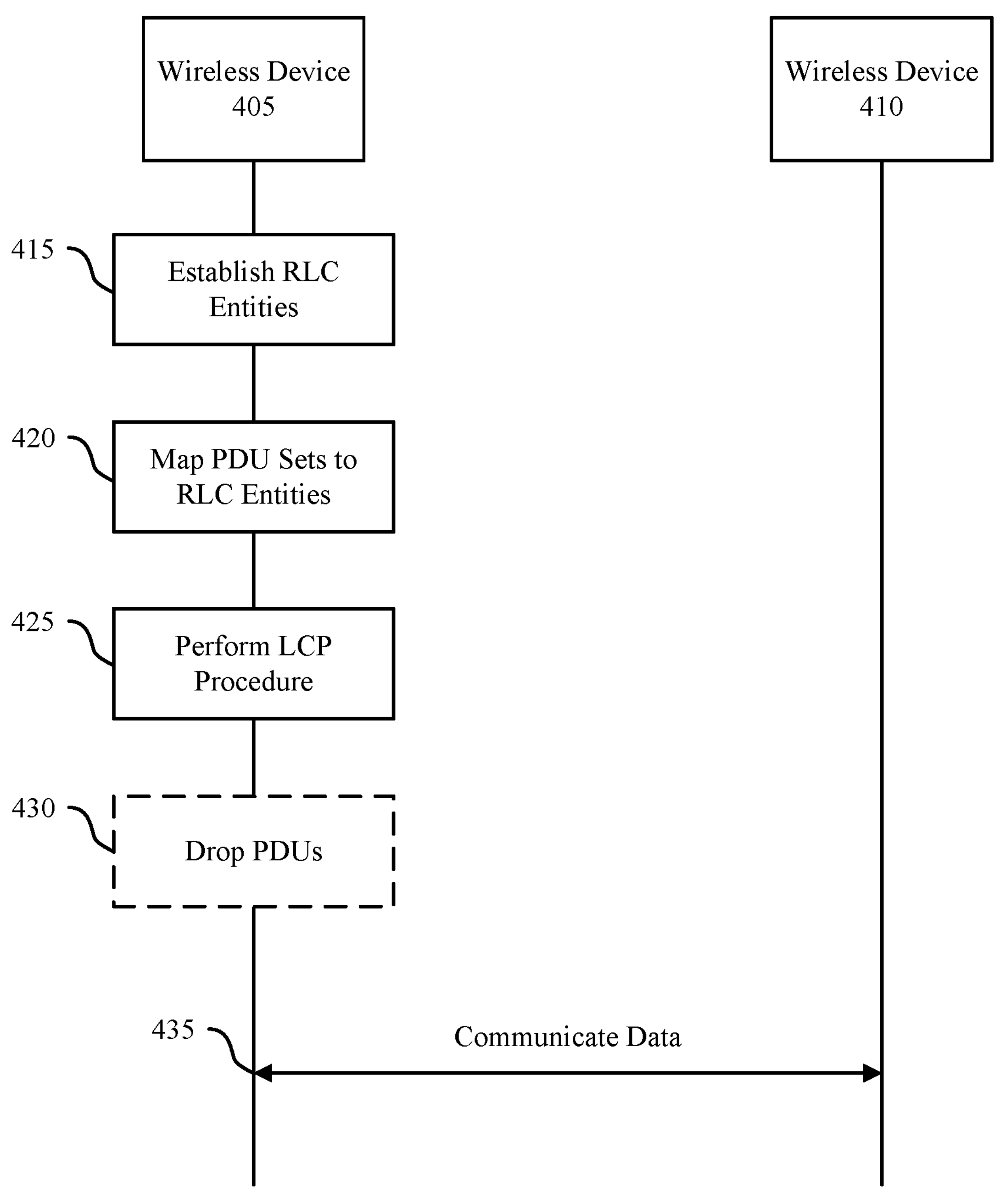
FIG. 4 illustrates an example of a process flow that supports L2 enhancements for PDU sets with different importance in accordance with one or more aspects of the present disclosure.

FIG. 4 illustrates an example of a process flow 400 that supports L2 enhancements for PDU sets with different importance in accordance with one or more aspects of the present disclosure. The process flow 400 may implement one or more aspects of the wireless communications system 100 and the wireless communications system 200. For example, the process flow 400 may include a wireless device 405 and a wireless device 410, which may each be examples of a UE 115 or a network entity 105 described with reference to FIG. 1. The wireless device 405 may establish one or more importance levels for a QoS flow, which may be examples of the importance levels 235 of the QoS flow 210 described with reference to FIG. 2. Alternative examples of the following may be implemented, where some processes are performed in a different order than described or are not performed. In some cases, processes may include additional features not mentioned below, or further processes may be added.

At 415, the wireless device 405 may establish multiple RLC entities. In some cases, establishing the multiple RLC entities may include establishing RLC entities associated with respective importance levels of a set of multiple importance levels. For example, each importance level of the multiple importance levels may be associated with a single RLC entity of the multiple RLC entities. As another example, the wireless device may select an importance level for PDCP duplication, and may associate multiple RLC entities with the selected importance level. In some cases, each RLC entity may be associated with a respective logical channel of the QoS flow. For example, a first RLC entity may be associated with a first logical channel and a second RLC entity may be associated with a second logical channel. In some other cases, multiple RLC entities may share a common logical channel of the QoS flow. For example, the first RLC entity and the second RLC entity may each be associated with the first logical channel. In some examples, the QoS flow, the importance levels of the QoS flow, the RLC entities of the QoS flow, and the logical channels of the QoS flow may be associated with a same DRB.

At 420, the wireless device 405 may map one or more PDU sets to the RLC entities of the QoS flow. For example, the wireless device 405 may map PDUs of a first PDU set associated with the QoS flow to a first RLC entity based on first characteristics of the first PDU set (e.g., an importance level of the first PDU set). Additionally, the wireless device 405 may map PDUs of a second PDU set associated with the QoS flow to a second RC entity based on second characteristics of the second PDU set (e.g., an importance level of the second PDU set). In some cases, PDUs of a PDU set may be duplicated if PDCP duplication is configured for an associated importance level. For example, the wireless device 405 may duplicate PDUs of the first PDU set and map the duplicate PDUs to a third RLC entity that is associated with the first importance level based on the first importance level being selected for duplication. In some cases, each RLC entity of the QoS flow may be associated with a respective set of RLC parameters (e.g., RLC timers), a respective segmentation buffer (e.g., an uplink buffer), and a respective reassembly buffer (e.g., a downlink buffer).

At 425, the wireless device 405 may perform an LCP procedure to schedule PDUs of the first PDU set, the second PDU set, or both for communications via one or more time-frequency resources (e.g., to fill a resource grant). In some cases, performing the LCP procedure may be based on an LCP restriction policy of logical channels associated with the first PDU set and the second PDU set. For example, the wireless device 405 may map PDUs of the first PDU set to a first subset of the one or more time-frequency resources based on a first LCP restriction policy of the first logical channel and may map PDUs of the second PDU set to a second subset of the one or more time-frequency resources based on a second LCP restriction policy of the second logical channel. Additionally, or alternatively, as part of the LCP procedure, the wireless device 405 may determine a scheduling priority for the first PDU set and the second PDU set. For example, the wireless device 405 may schedule PDUs of the first PDU set for transmission and may schedule PDUs of the second PDU set for transmission after scheduling the first PDU set due to the first importance level being greater than the second importance level. In some other cases, the wireless device 405 may determine how much data from each importance level and an order for multiplexing the data for scheduling the data for communications. The wireless device 405 may associate PDUs from different RLC entities with different MAC sub-PDUs (e.g., if RLC entities are associated with respective logical channels) or may associate PDUs from different RLC entities with a same MAC sub-PDU (e.g., if RLC entities share a common logical channel). In some examples, the first logical channel may be associated with a first LCP priority and the second logical channel may be associated with a second LCP priority, where the first LCP priority and the second LCP priority may be the same or different.

In some cases, the logical channels of the QoS flow may share a common set of LCP parameters. For example, the first logical channel and the second logical channel may be associated with a same PBR, a same BSD, or both, which may be set according to one or more characteristics of the QoS flow, such as a GBR and an MDVB of the QoS flow. In such examples, the wireless device 405 may decrement a common state variable (e.g., associated with each logical channel of the QoS flow) according to a total amount of data scheduled across each RLC entity. In some other cases, the logical channels of the QoS flow may be associated with respective sets of LCP parameters. For example, the first logical channel may be associated with a first PBR, a first BSD, or both and the second logical channel may be associated with a second PBR, a second BSD, or both. In some cases, such as when the first importance level is selected for PDCP duplication, the first logical channel a third logical channel associated with the third RLC entity may be associated with a same set of LCP parameters.

At 430, the wireless device 405 may drop one or more PDUs based on the importance levels of the QoS flow. For example, in the presence of channel congestion, the wireless device 405 may determine which PDUs should be dropped according to importance levels of the PDUs. In some examples, the wireless device may drop one or more first PDUs of the first PDU set based on the second importance level being higher than the first importance level. In some other examples, the wireless device may drop one or more second PDUs of the second PDU set based on the first importance level being higher than the second importance level.

At 435, the wireless device 405 and the wireless device 410 may communicate data. For example, the wireless device 405 may communicate at least a subset of the PDUs of the first PDU set, the second PDU set, or both via the one or more time-frequency resources according to the LCP procedure and RLC mappings.

Figure 5:
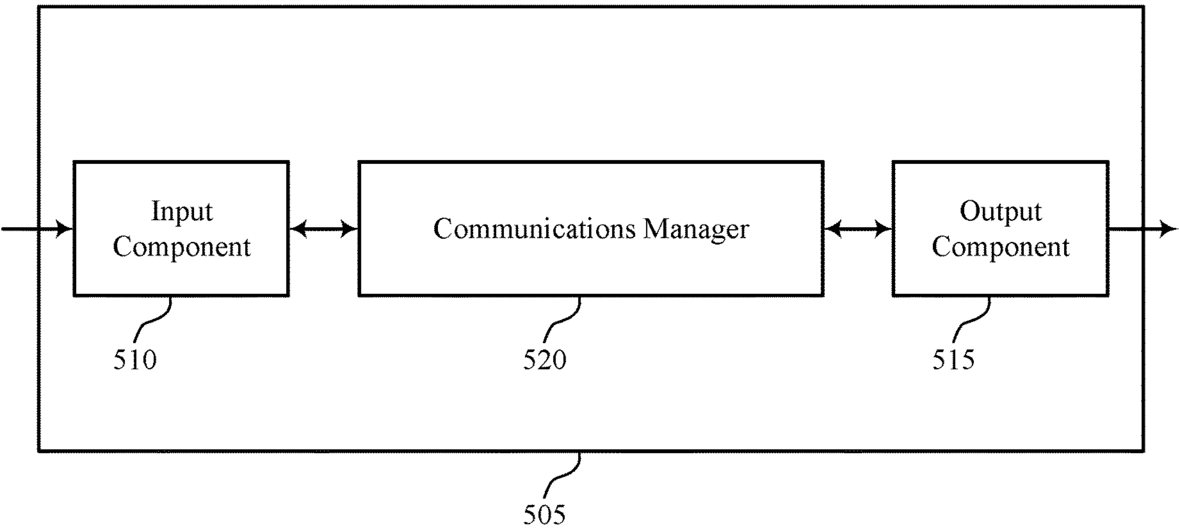
FIGS. 5 and 6 illustrate block diagrams of devices that support L2 enhancements for PDU sets with different importance in accordance with one or more aspects of the present disclosure.

FIG. 5 illustrates a block diagram 500 of a device 505 that supports L2 enhancements for PDU sets with different importance in accordance with one or more aspects of the present disclosure. The device 505 may be an example of aspects of a Generic Device as described herein, which may be an example of a UE 115 or a network entity 105 described with reference to FIG. 1. The device 505 may include an input component 510, an output component 515, and a communications manager 520. The device 505 may also include a processor. Each of these components may be in communication with one another (e.g., via one or more buses).

The input component 510 may manage input signals for the device 505. For example, the input component 510 may identify input signals based on an interaction with a modem, a keyboard, a mouse, a touchscreen, or a similar device. These input signals may be associated with user input or processing at other components or devices. In some cases, the input component 510 may utilize an operating system such as iOS®, ANDROID®, MS-DOS®, MS-WINDOWS®, OS/2®, UNIX®, LINUX®, or another known operating system to handle input signals. The input component 510 may send aspects of these input signals to other components of the device 505 for processing. For example, the input component 510 may transmit input signals to the communications manager 520 to support L2 enhancements for PDU sets with different importance. In some cases, the input component 510 may be a component of an I/O controller 810 as described with reference to FIG. 8.

The output component 515 may manage output signals for the device 505. For example, the output component 515 may receive signals from other components of the device 505, such as the communications manager 520, and may transmit these signals to other components or devices. In some specific examples, the output component 515 may transmit output signals for display in a user interface, for storage in a database or data store, for further processing at a server or server cluster, or for any other processes at any number of devices or systems. In some cases, the output component 515 may be a component of an I/O controller 810 as described with reference to FIG. 8.

The communications manager 520, the input component 510, the output component 515, or various combinations thereof or various components thereof may be examples of means for performing various aspects of L2 enhancements for PDU sets with different importance as described herein. For example, the communications manager 520, the input component 510, the output component 515, or various combinations or components thereof may support a method for performing one or more of the functions described herein.

In some examples, the communications manager 520, the input component 510, the output component 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the input component 510, the output component 515, or various combinations or components thereof may be implemented in code (e.g., as communications management software or firmware) executed by a processor. If implemented in code executed by a processor, the functions of the communications manager 520, the input component 510, the output component 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the input component 510, the output component 515, or both. For example, the communications manager 520 may receive information from the input component 510, send information to the output component 515, or be integrated in combination with the input component 510, the output component 515, or both to obtain information, output information, or perform various other operations as described herein.

The communications manager 520 may support wireless communication at a wireless device in accordance with examples as disclosed herein. For example, the communications manager 520 may be configured as or otherwise support a means for establishing a configuration for a first QoS flow, the configuration establishing a set of multiple RLC entities. The communications manager 520 may be configured as or otherwise support a means for mapping PDUs of a first PDU setting associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics of the second PDU set. The communications manager 520 may be configured as or otherwise support a means for communicating at least a subset of the PDUs of the first PDU set, the second PDU set, or both via one or more time-frequency resources based on the mapping.

By including or configuring the communications manager 520 in accordance with examples as described herein, the device 505 (e.g., a processor controlling or otherwise coupled with the input component 510, the output component 515, the communications manager 520, or a combination thereof) may support techniques for more efficient utilization of communication resources by reducing a likelihood that important PDU sets are dropped during communications.

Figure 6:
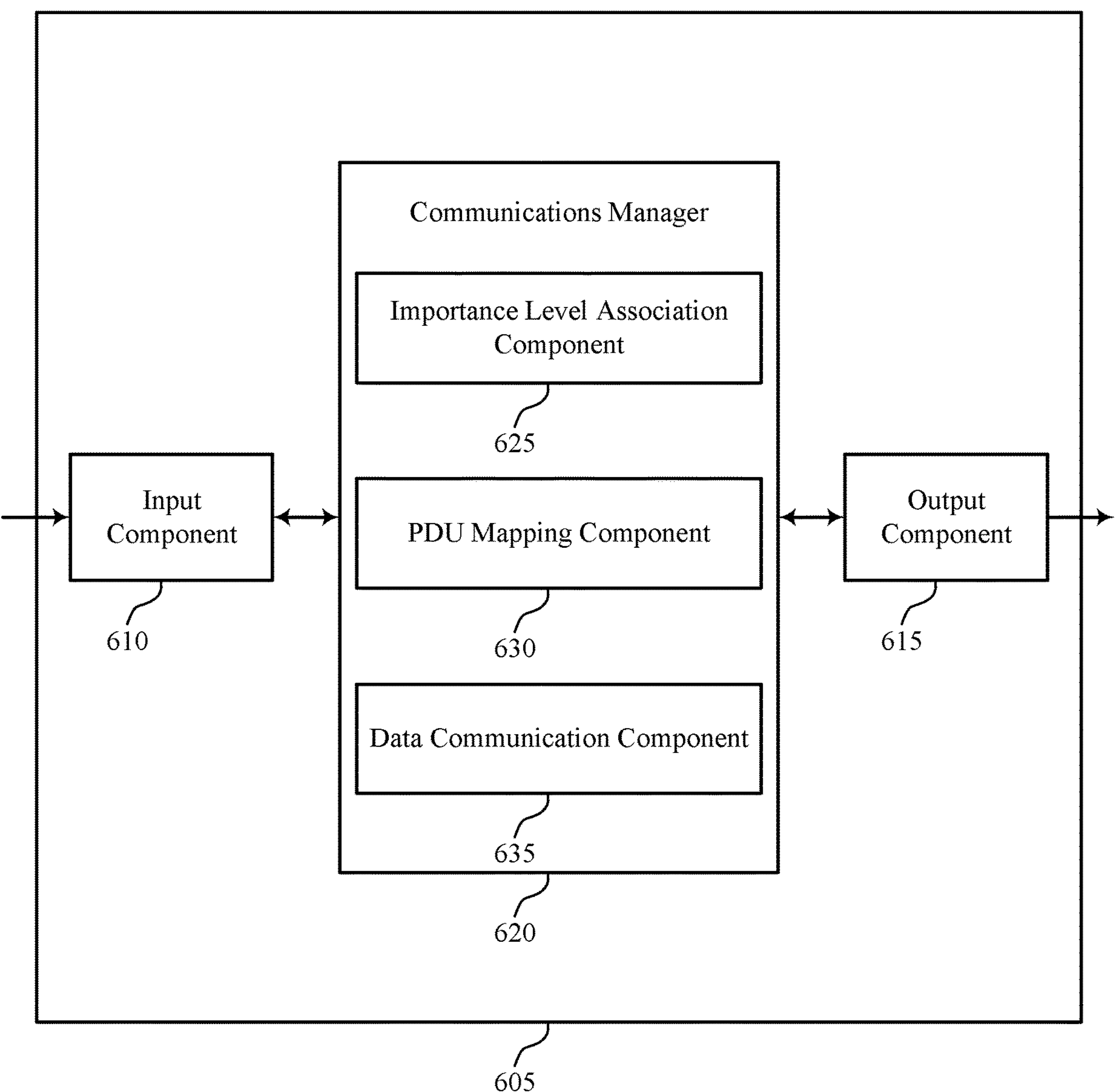

FIG. 6 illustrates a block diagram 600 of a device 605 that supports L2 enhancements for PDU sets with different importance in accordance with one or more aspects of the present disclosure. The device 605 may be an example of aspects of a device 505 or a Generic Device as described herein, which may be an example of a UE 115 or a network entity 105 described with reference to FIG. 1. The device 605 may include an input component 610, an output component 615, and a communications manager 620. The device 605 may also include a processor. Each of these components may be in communication with one another (e.g., via one or more buses).

The input component 610 may manage input signals for the device 605. For example, the input component 610 may identify input signals based on an interaction with a modem, a keyboard, a mouse, a touchscreen, or a similar device. These input signals may be associated with user input or processing at other components or devices. In some cases, the input component 610 may utilize an operating system such as iOS®, ANDROID®, MS-DOS®, MS-WINDOWS®, OS/2®, UNIX®, LINUX®, or another known operating system to handle input signals. The input component 610 may send aspects of these input signals to other components of the device 605 for processing. For example, the input component 610 may transmit input signals to the communications manager 620 to support L2 enhancements for PDU sets with different importance. In some cases, the input component 610 may be a component of an I/O controller 810 as described with reference to FIG. 8.

The output component 615 may manage output signals for the device 605. For example, the output component 615 may receive signals from other components of the device 605, such as the communications manager 620, and may transmit these signals to other components or devices. In some specific examples, the output component 615 may transmit output signals for display in a user interface, for storage in a database or data store, for further processing at a server or server cluster, or for any other processes at any number of devices or systems. In some cases, the output component 615 may be a component of an I/O controller 810 as described with reference to FIG. 8.

The device 605, or various components thereof, may be an example of means for performing various aspects of L2 enhancements for PDU sets with different importance as described herein. For example, the communications manager 620 may include an importance level association component 625, a PDU mapping component 630, a data communication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the input component 610, the output component 615, or both. For example, the communications manager 620 may receive information from the input component 610, send information to the output component 615, or be integrated in combination with the input component 610, the output component 615, or both to obtain information, output information, or perform various other operations as described herein.

The communications manager 620 may support wireless communication at a wireless device in accordance with examples as disclosed herein. The importance level association component 625 may be configured as or otherwise support a means for establishing a configuration for a first QoS flow, the configuration establishing a set of multiple RLC entities. The PDU mapping component 630 may be configured as or otherwise support a means for mapping PDUs of a first PDU set associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics associated with the second PDU set. The data communication component 635 may be configured as or otherwise support a means for communicating at least a subset of the PDUs of the first PDU set, the second PDU set, or both via one or more time-frequency resources based on the mapping.

Figure 7:
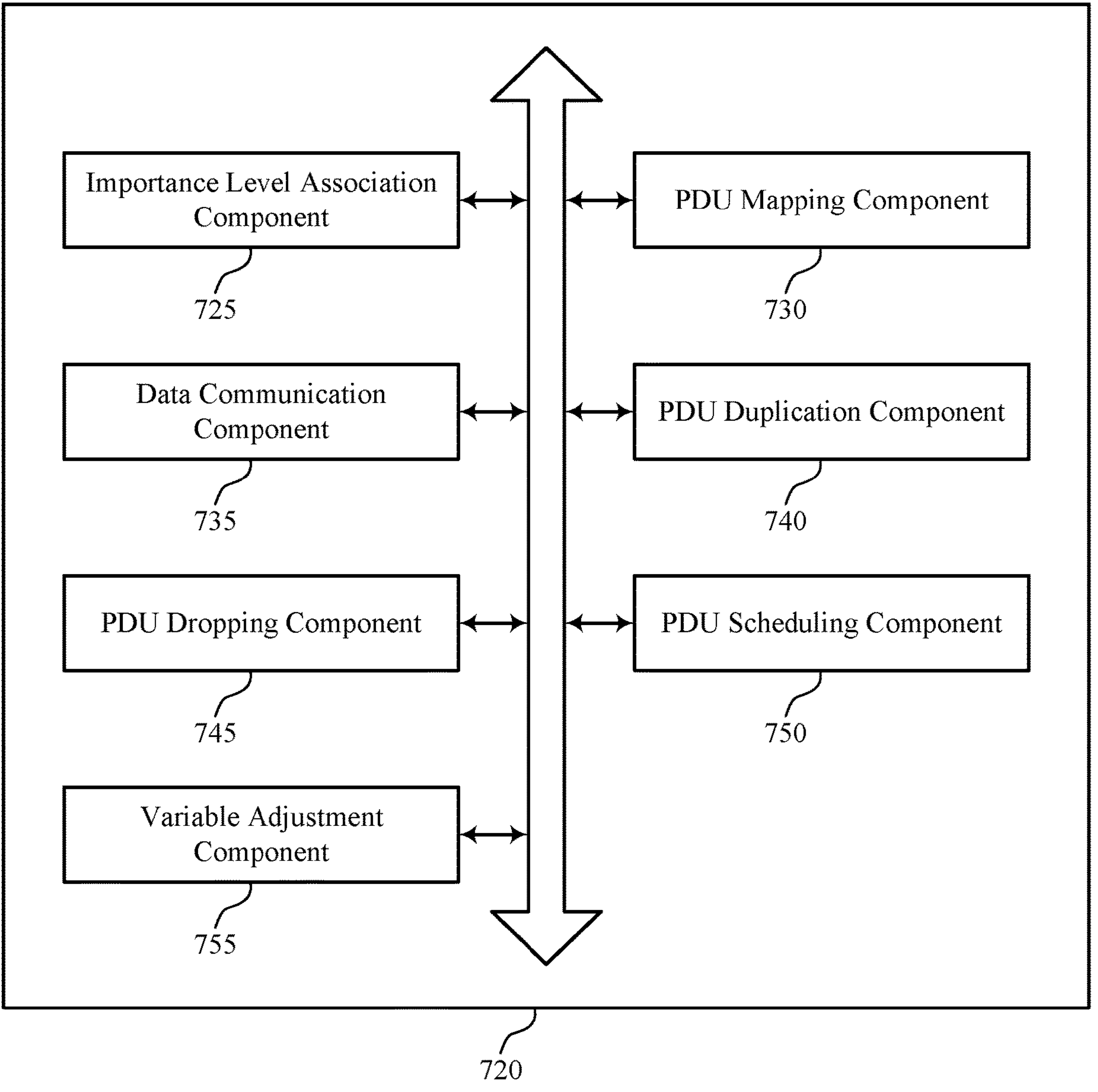
FIG. 7 illustrates a block diagram of a communications manager that supports L2 enhancements for PDU sets with different importance in accordance with one or more aspects of the present disclosure.

FIG. 7 illustrates a block diagram 700 of a communications manager 720 that supports L2 enhancements for PDU sets with different importance in accordance with one or more aspects of the present disclosure. The communications manager 720 may be an example of aspects of a communications manager 520, a communications manager 620, or both, as described herein. The communications manager 720, or various components thereof, may be an example of means for performing various aspects of L2 enhancements for PDU sets with different importance as described herein. For example, the communications manager 720 may include an importance level association component 725, a PDU mapping component 730, a data communication component 735, a PDU duplication component 740, a PDU dropping component 745, a PDU scheduling component 750, a variable adjustment component 755, or any combination thereof. Each of these components may communicate, directly or indirectly, with one another (e.g., via one or more buses).

The communications manager 720 may support wireless communication at a wireless device in accordance with examples as disclosed herein. The importance level association component 725 may be configured as or otherwise support a means for establishing a configuration for a first QoS flow, the configuration establishing a set of multiple RLC entities. The PDU mapping component 730 may be configured as or otherwise support a means for mapping PDUs of a first PDU set associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics associated with the second PDU set. The data communication component 735 may be configured as or otherwise support a means for communicating at least a subset of the PDUs of the first PDU set, the second PDU set, or both via one or more time-frequency resources based on the mapping.

In some examples, the first RLC entity is associated with a first logical channel of a set of multiple logical channels and the second RLC entity is associated with a second logical channel of the set of multiple logical channels, the set of multiple logical channels associated with the first QoS flow.

In some examples, the PDU mapping component 730 may be configured as or otherwise support a means for mapping the PDUs of the first PDU set to a first subset of the one or more time-frequency resources based on a first LCP restriction policy associated with the first logical channel. In some examples, the PDU mapping component 730 may be configured as or otherwise support a means for mapping the PDUs of the second PDU set to a second subset of the one or more time-frequency resources based on a second LCP restriction policy associated with the second logical channel.

In some examples, the first logical channel is associated with a first LCP priority and the second logical channel is associated with a second LCP priority.

In some examples, the first logical channel and the second logical channel are associated with a first LCP parameter, the first LCP parameter based on one or more characteristics of the first QoS flow.

In some examples, the first LCP parameter includes a first PBR, a first BSD, or both.

In some examples, the variable adjustment component 755 may be configured as or otherwise support a means for decrementing a state variable that is associated with the set of multiple logical channels based on communicating at least the subset of the PDUs of the first PDU set, the second PDU set, or both.

In some examples, the first logical channel is associated with a first LCP parameter and the second logical channel is associated with a second LCP parameter. In some examples, the first LCP parameter, the second LCP parameter, or both is based on one or more characteristics of the first QoS flow.

In some examples, the first LCP parameter includes a first PBR, a first BSD, or both and the second LCP parameter includes a second PBR, a second BSD, or both.

In some examples, to support communicating at least the subset of the PDUs of the first PDU set, the second PDU set, or both, the PDU dropping component 745 may be configured as or otherwise support a means for dropping one or more first PDUs of the first PDU set based on the second importance level being higher than the first importance level. In some examples, to support communicating at least the subset of the PDUs of the first PDU set, the second PDU set, or both, the PDU dropping component 745 may be configured as or otherwise support a means for dropping one or more second PDUs of the second PDU set based on the first importance level being higher than the second importance level.

In some examples, the PDU scheduling component 750 may be configured as or otherwise support a means for scheduling one or more first PDUs of the first PDU set for transmission via the one or more time-frequency resources. In some examples, the PDU scheduling component 750 may be configured as or otherwise support a means for scheduling, after scheduling the one or more first PDUs, one or more second PDUs of the second PDU set for transmission via the one or more time-frequency resources, where the one or more second PDUs are scheduled after the one or more first PDUs based on the first importance level being higher than the second importance level.

In some examples, establishing the configuration for the first QoS flow includes establishing a third RLC entity of the set of multiple RLC entities based on the first importance level being selected for duplication of one or more PDUs; and the method further includes. In some examples, duplicating the PDUs of the first PDU set. In some examples, mapping the duplicated PDUs of the first PDU set to the third RLC entity.

In some examples, the third RLC entity is associated with a third logical channel. In some examples, the first logical channel and the third logical channel are associated with a first LCP parameter.

In some examples, the first RLC entity and the second RLC entity are associated with a first logical channel of a set of multiple logical channels, the set of multiple logical channels associated with the first QoS flow.

In some examples, each RLC entity of the set of multiple RLC entities is associated with a respective set of RLC parameters of a set of multiple sets of RLC parameters.

In some examples, each RLC entity of the set of multiple RLC entities is associated with a respective segmentation buffer and a respective reassembly buffer.

Figure 8:
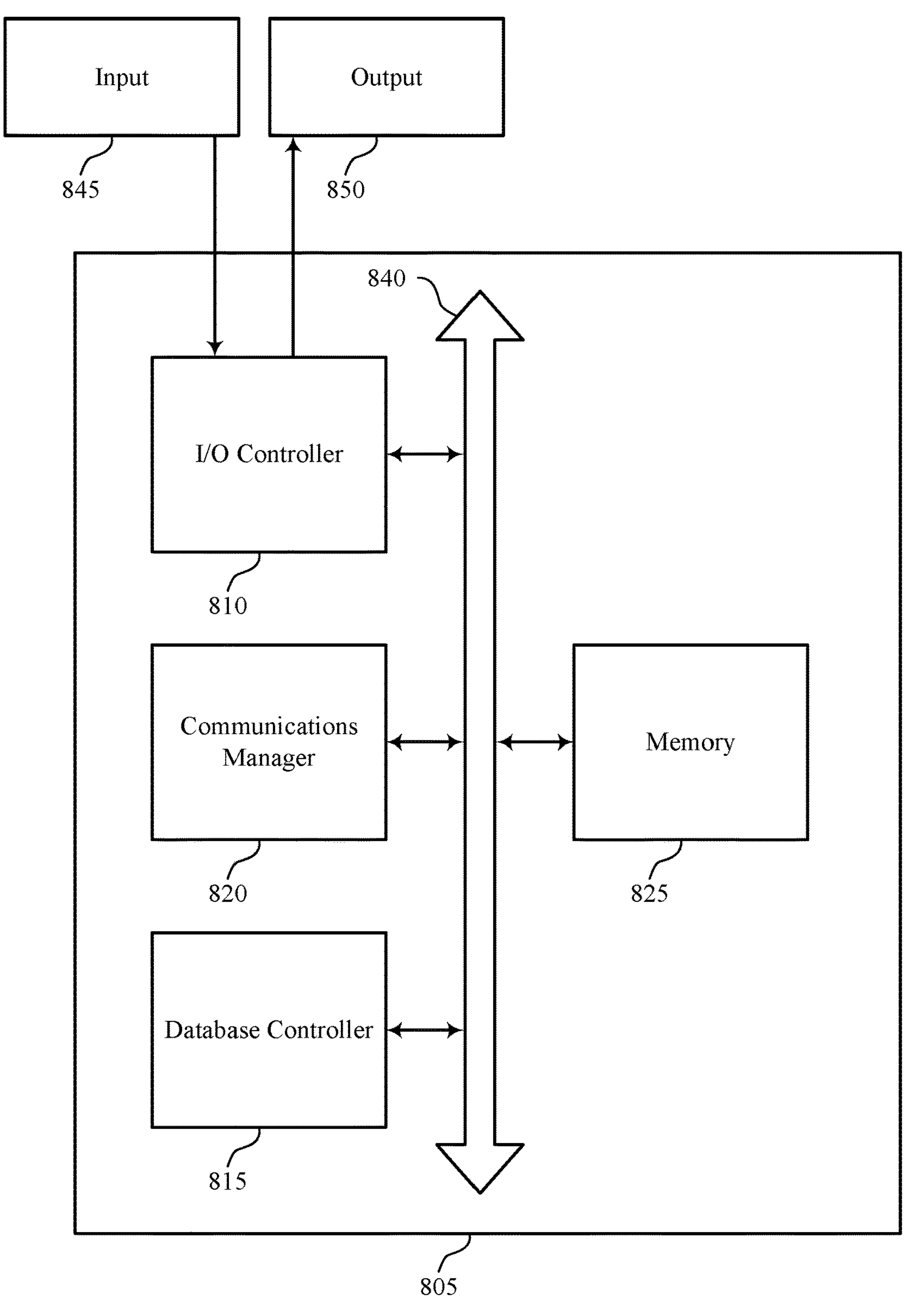
FIG. 8 illustrates a diagram of a system including a device that supports L2 enhancements for PDU sets with different importance in accordance with one or more aspects of the present disclosure.

FIG. 8 illustrates a diagram of a system 800 including a device 805 that supports L2 enhancements for PDU sets with different importance in accordance with one or more aspects of the present disclosure. The device 805 may be an example of or include the components of a device 505, a device 605, or a Generic Device as described herein, which may be an example of a UE 115 or a network entity 105 described with reference to FIG. 1. The device 805 may include components for bi-directional voice and data communications including components for transmitting and receiving communications, such as a communications manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor. In some examples, a user may interact with the device 805 via the I/O controller 810 or via hardware components controlled by the I/O controller 810.

The database controller 815 may manage data storage and processing in a database 835. The database 835 may be external to the device 805, temporarily or permanently connected to the device 805, or a data storage component of the device 805. In some cases, a user may interact with the database controller 815. In some other cases, the database controller 815 may operate automatically without user interaction. The database 835 may be an example of a persistent data store, a single database, a distributed database, multiple distributed databases, a database management system, or an emergency backup database.

Memory 825 may include random-access memory (RAM) and ROM. The memory 825 may store computer-readable, computer-executable software including instructions that, when executed, cause the processor to perform various functions described herein. In some cases, the memory 825 may contain, among other things, a BIOS which may control basic hardware or software operation such as the interaction with peripheral components or devices.

The processor 830 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In some other cases, a memory controller may be integrated into the processor 830. The processor 830 may be configured to execute computer-readable instructions stored in memory 825 to perform various functions (e.g., functions or tasks supporting L2 enhancements for PDU sets with different importance).

The communications manager 820 may support wireless communication at a wireless device in accordance with examples as disclosed herein. For example, the communications manager 820 may be configured as or otherwise support a means for establishing a configuration for a first QoS flow, the configuration establishing a set of multiple RLC entities. The communications manager 820 may be configured as or otherwise support a means for mapping PDUs of a first PDU setting associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics associated with the second PDU set. The communications manager 820 may be configured as or otherwise support a means for communicating at least a subset of the PDUs of the first PDU set, the second PDU set, or both via one or more time-frequency resources based on the mapping.

By including or configuring the communications manager 820 in accordance with examples as described herein, the device 805 may support techniques for more efficient utilization of communication resources by reducing a likelihood that important PDU sets are dropped during communications.

FIG. 9 illustrates a flowchart showing a method 900 that supports L2 enhancements for PDU sets with different importance in accordance with one or more aspects of the present disclosure. The operations of the method 900 may be implemented by a Generic Device or its components as described herein. For example, the operations of the method 900 may be performed by a Generic Device as described with reference to FIGS. 1 through 8. In some examples, a Generic Device may execute a set of instructions to control the functional elements of the Generic Device to perform the described functions. Additionally, or alternatively, the Generic Device may perform aspects of the described functions using special-purpose hardware.

At 905, the method may include establishing a configuration for a first QoS flow, the configuration establishing a set of multiple RLC entities. The operations of 905 may be performed in accordance with examples as disclosed herein. In some examples, aspects of the operations of 905 may be performed by an importance level association component 725 as described with reference to FIG. 7.

At 910, the method may include mapping PDUs of a first PDU set associated with the first QoS flow to a first RLC entity of the set of multiple RLC entities based on first characteristics associated with the first PDU set and mapping PDUs of a second PDU set associated with the first QoS flow to a second RLC entity of the set of multiple RLC entities based on second characteristics associated with the second PDU set. The operations of 910 may be performed in accordance with examples as disclosed herein. In some examples, aspects of the operations of 910 may be performed by a PDU mapping component 730 as described with reference to FIG. 7.

At 915, the method may include communicating at least a subset of the PDUs of the first PDU set, the second PDU set, or both via one or more time-frequency resources based on the mapping. The operations of 915 may be performed in accordance with examples as disclosed herein. In some examples, aspects of the operations of 915 may be performed by a data communication component 735 as described with reference to FIG. 7.

The following provides an overview of aspects of the present disclosure:

Aspect 1: A method for wireless communication at a wireless device, comprising: establishing a configuration for a first QoS flow, the configuration establishing a plurality of RLC entities; mapping PDUs of a first PDU set associated with the first QoS flow to a first RLC entity of the plurality of RLC entities based at least in part on first characteristics associated with the first PDU set and mapping PDUs of a second PDU set associated with the first QoS flow to a second RLC entity of the plurality of RLC entities based at least in part on second characteristics associated with the second PDU set; and communicating at least a subset of the PDUs of the first PDU set, the second PDU set, or both via one or more time-frequency resources based at least in part on the mapping.

Aspect 2: The method of aspect 1, wherein the first RLC entity is associated with a first logical channel of a plurality of logical channels and the second RLC entity is associated with a second logical channel of the plurality of logical channels, the plurality of logical channels associated with the first QoS flow.

Aspect 3: The method of aspect 2, further comprising: mapping the PDUs of the first PDU set to a first subset of the one or more time-frequency resources based at least in part on a first LCP restriction policy associated with the first logical channel; and mapping the PDUs of the second PDU set to a second subset of the one or more time-frequency resources based at least in part on a second LCP restriction policy associated with the second logical channel.

Aspect 4: The method of any of aspects 2 through 3, wherein the first logical channel is associated with a first LCP priority and the second logical channel is associated with a second LCP priority.

Aspect 5: The method of any of aspects 2 through 4, wherein the first logical channel and the second logical channel are associated with a first LCP parameter, the first LCP parameter based at least in part on one or more characteristics of the first QoS flow.

Aspect 6: The method of aspect 5, wherein the first LCP parameter comprises a first PBR, a first BSD, or both.

Aspect 7: The method of aspect 5, further comprising: decrementing a state variable that is associated with the plurality of logical channels based at least in part on communicating at least the subset of the PDUs of the first PDU set, the second PDU set, or both.

Aspect 8: The method of aspect 2, wherein the first logical channel is associated with a first LCP parameter and the second logical channel is associated with a second LCP parameter, and the first LCP parameter, the second LCP parameter, or both is based at least in part on one or more characteristics of the first QoS flow.

Aspect 9: The method of aspect 8, wherein the first LCP parameter comprises a first PBR, a first BSD, or both and the second LCP parameter comprises a second PBR, a second BSD, or both.

Aspect 10: The method of any of aspects 2 through, wherein the first QoS flow, the first RLC entity, the second RLC entity, the first logical channel, and the second logical channel, are associated with a same data radio bearer.

Aspect 11: The method of aspect 1, wherein the first RLC entity and the second RLC entity are associated with a first logical channel of a plurality of logical channels, the plurality of logical channels associated with the first QoS flow.

Aspect 12: The method of aspect 1, wherein the plurality of RLC entities are associated with respective importance levels of a plurality of importance levels associated with the first QoS flow, the first characteristics associated with the first PDU set indicate that the first PDU set is associated with a first importance level of the plurality of importance levels, and the second characteristics associated with the second PDU set indicate that the second PDU set is associated with a second importance level of the plurality of importance levels.

Aspect 13: The method of aspect 12, wherein communicating at least the subset of the PDUs of the first PDU set, the second PDU set, or both further comprises: dropping one or more first PDUs of the first PDU set based at least in part on the second importance level being higher than the first importance level; or dropping one or more second PDUs of the second PDU set based at least in part on the first importance level being higher than the second importance level.

Aspect 14: The method of aspect 12, further comprising: scheduling one or more first PDUs of the first PDU set for transmission via the one or more time-frequency resources; and scheduling, after scheduling the one or more first PDUs, one or more second PDUs of the second PDU set for transmission via the one or more time-frequency resources, wherein the one or more second PDUs are scheduled after the one or more first PDUs based at least in part on the first importance level being higher than the second importance level.

Aspect 15: The method of aspect 12, wherein establishing the configuration for the first QoS flow comprises establishing a third RLC entity of the plurality of RLC entities based at least in part on the first importance level being selected for duplication of one or more PDUs; and the method further comprises: duplicating the PDUs of the first PDU set; and mapping the duplicated PDUs of the first PDU set to the third RLC entity.

Aspect 16: The method of aspect 15, wherein the third RLC entity is associated with a third logical channel, and the first logical channel and the third logical channel are associated with a first LCP parameter.

Aspect 17: The method of any of aspects 1 through 16, wherein each RLC entity of the plurality of RLC entities is associated with a respective set of RLC parameters of a plurality of sets of RLC parameters.

Aspect 18: The method of any of aspects 1 through 17, wherein each RLC entity of the plurality of RLC entities is associated with a respective segmentation buffer and a respective reassembly buffer.

Aspect 19: A UE for wireless communication, comprising one or more memories storing processor-executable code, and one or more processors coupled with the one or more memories and individually or collectively operable to execute the code to cause the first UE to perform a method of any of aspects 1 through 17.

Aspect 19: A UE for wireless communication e, comprising at least one means for performing a method of any of aspects 1 through 17.

Aspect 20: A non-transitory computer-readable medium storing code for wireless communication at a wireless device, the code comprising instructions executable by one or more processors to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and individually or collectively operable to execute the code to cause the UE to:

establish a configuration for a first quality of service flow, the configuration establishing a plurality of radio link control entities, wherein:

a first radio link control entity of the plurality of radio link control entities is associated with a first set of radio link control parameters of a plurality of sets of radio link control parameters, wherein the first radio link control entity is configured with the first set of radio link control parameters based at least in part on first characteristics associated with the first radio link control entity, and a second radio link control entity of the plurality of radio link control entities is associated with a second set of radio link control parameters of the plurality of sets of radio link control parameters, wherein the second radio link control entity is configured with the second set of radio link control parameters based at least in part on second characteristics associated with the second radio link control entity;

map protocol data units of a first protocol data unit set associated with the first quality of service flow to the first radio link control entity of the plurality of radio link control entities based at least in part on the first characteristics associated with the first protocol data unit set and the first radio link control entity;

map protocol data units of a second protocol data unit set associated with the first quality of service flow to the second radio link control entity of the plurality of radio link control entities based at least in part on the second characteristics associated with the second protocol data unit set and the second radio link control entity; and communicate at least a subset of the protocol data units of the first protocol data unit set, the second protocol data unit set, or both via one or more time- frequency resources based at least in part on the mapping.

2. The UE of claim 1, wherein the first radio link control entity is associated with a first logical channel of a plurality of logical channels and the second radio link control entity is associated with a second logical channel of the plurality of logical channels, the plurality of logical channels associated with the first quality of service flow.

3. The UE of claim 2, wherein the one or more processors are individually or collectively further operable to execute the code to cause the UE to:

map the protocol data units of the first protocol data unit set to a first subset of the one or more time-frequency resources based at least in part on a first logical channel prioritization restriction policy associated with the first logical channel; and map the protocol data units of the second protocol data unit set to a second subset of the one or more time-frequency resources based at least in part on a second logical channel prioritization restriction policy associated with the second logical channel.

4. The UE of claim 2, wherein the first logical channel is associated with a first logical channel prioritization priority and the second logical channel is associated with a second logical channel prioritization priority.

5. The UE of claim 2, wherein the first logical channel and the second logical channel are associated with a first logical channel prioritization parameter, the first logical channel prioritization parameter based at least in part on one or more characteristics of the first quality of service flow.

6. The UE of claim 5, wherein the first logical channel prioritization parameter comprises a first prioritized bit rate, a first bucket size duration, or both.

7. The UE of claim 5, wherein the one or more processors are individually or collectively further operable to execute the code to cause the UE to:

decrement a state variable that is associated with the plurality of logical channels based at least in part on communicating at least the subset of the protocol data units of the first protocol data unit set, the second protocol data unit set, or both.

8. The UE of claim 2, wherein:

the first logical channel is associated with a first logical channel prioritization parameter and the second logical channel is associated with a second logical channel prioritization parameter; and the first logical channel prioritization parameter, the second logical channel prioritization parameter, or both is based at least in part on one or more characteristics of the first quality of service flow.

9. The UE of claim 8, wherein the first logical channel prioritization parameter comprises a first prioritized bit rate, a first bucket size duration, or both and the second logical channel prioritization parameter comprises a second prioritized bit rate, a second bucket size duration, or both.

10. The UE of claim 2, wherein the first quality of service flow, the first radio link control entity, the second radio link control entity, the first logical channel, and the second logical channel, are associated with a same data radio bearer.

11. The UE of claim 1, wherein the first radio link control entity and the second radio link control entity are associated with a first logical channel of a plurality of logical channels, the plurality of logical channels associated with the first quality of service flow.

12. The UE of claim 1, wherein:

the plurality of radio link control entities are associated with respective importance levels of a plurality of importance levels associated with the first quality of service flow;

the first characteristics associated with the first protocol data unit set indicate that the first protocol data unit set is associated with a first importance level of the plurality of importance levels; and the second characteristics associated with the second protocol data unit set indicate that the second protocol data unit set is associated with a second importance level of the plurality of importance levels.

13. The UE of claim 12, wherein, to communicate at least the subset of the protocol data units of the first protocol data unit set, the second protocol data unit set, or both, the one or more processors are individually or collectively operable to execute the code to cause the UE to:

drop one or more first protocol data units of the first protocol data unit set based at least in part on the second importance level being higher than the first importance level; or drop one or more second protocol data units of the second protocol data unit set based at least in part on the first importance level being higher than the second importance level.

14. The UE of claim 12, wherein the one or more processors are individually or collectively further operable to execute the code to cause the UE to:

schedule one or more first protocol data units of the first protocol data unit set for transmission via the one or more time-frequency resources; and schedule, after scheduling the one or more first protocol data units, one or more second protocol data units of the second protocol data unit set for transmission via the one or more time-frequency resources, wherein the one or more second protocol data units are scheduled after the one or more first protocol data units based at least in part on the first importance level being higher than the second importance level.

15. The UE of claim 12, wherein, to establish the configuration for the first quality of service flow, the one or more processors are individually or collectively operable to execute the code to cause the UE to:

establish a third radio link control entity of the plurality of radio link control entities based at least in part on the first importance level being selected for duplication of one or more protocol data units; and the one or more processors are individually or collectively further operable to execute the code to cause the UE to:

duplicate the protocol data units of the first protocol data unit set; and map the duplicated protocol data units of the first protocol data unit set to the third radio link control entity.

16. The UE of claim 15, wherein:

the first radio link control entity is associated with a first logical channel and the third radio link control entity is associated with a third logical channel; and the first logical channel and the third logical channel are associated with a first logical channel prioritization parameter.

17. The UE of claim 1, wherein each radio link control entity of the plurality of radio link control entities is associated with a respective set of radio link control parameters of the plurality of sets of radio link control parameters.

18. The UE of claim 1, wherein each radio link control entity of the plurality of radio link control entities is associated with a respective segmentation buffer and a respective reassembly buffer.

19. A method for wireless communication by a user equipment (UE), comprising:

establishing a configuration for a first quality of service flow, the configuration establishing a plurality of radio link control entities, wherein:

a first radio link control entity of the plurality of radio link control entities is associated with a first set of radio link control parameters of a plurality of sets of radio link control parameters, wherein the first radio link control entity is configured with the first set of radio link control parameters based at least in part on first characteristics associated with the first radio link control entity, and a second radio link control entity of the plurality of radio link control entities is associated with a second set of radio link control parameters of the plurality of sets of radio link control parameters, wherein the second radio link control entity is configured with the second set of radio link control parameters based at least in part on second characteristics associated with the second radio link control entity;

mapping protocol data units of a first protocol data unit set associated with the first quality of service flow to the first radio link control entity of the plurality of radio link control entities based at least in part on the first characteristics associated with the first protocol data unit set and the first radio link control entity;

mapping protocol data units of a second protocol data unit set associated with the first quality of service flow to the second radio link control entity of the plurality of radio link control entities based at least in part on the second characteristics associated with the second protocol data unit set and the second radio link control entity; and communicating at least a subset of the protocol data units of the first protocol data unit set, the second protocol data unit set, or both via one or more time-frequency resources based at least in part on the mapping.

20. The method of claim 19, wherein the first radio link control entity is associated with a first logical channel of a plurality of logical channels and the second radio link control entity is associated with a second logical channel of the plurality of logical channels, the plurality of logical channels associated with the first quality of service flow.

21. The method of claim 20, further comprising:

mapping the protocol data units of the first protocol data unit set to a first subset of the one or more time-frequency resources based at least in part on a first logical channel prioritization restriction policy associated with the first logical channel; and mapping the protocol data units of the second protocol data unit set to a second subset of the one or more time-frequency resources based at least in part on a second logical channel prioritization restriction policy associated with the second logical channel.

22. The method of claim 20, wherein the first logical channel is associated with a first logical channel prioritization priority and the second logical channel is associated with a second logical channel prioritization priority.

23. The method of claim 20, wherein the first logical channel and the second logical channel are associated with a first logical channel prioritization parameter, the first logical channel prioritization parameter based at least in part on one or more characteristics of the first quality of service flow.

24. The method of claim 23, wherein the first logical channel prioritization parameter comprises a first prioritized bit rate, a first bucket size duration, or both.

25. The method of claim 23, further comprising:

decrementing a state variable that is associated with the plurality of logical channels based at least in part on communicating at least the subset of the protocol data units of the first protocol data unit set, the second protocol data unit set, or both.

26. The method of claim 20, wherein:

the first logical channel is associated with a first logical channel prioritization parameter and the second logical channel is associated with a second logical channel prioritization parameter; and the first logical channel prioritization parameter, the second logical channel prioritization parameter, or both is based at least in part on one or more characteristics of the first quality of service flow.

27. The method of claim 26, wherein the first logical channel prioritization parameter comprises a first prioritized bit rate, a first bucket size duration, or both and the second logical channel prioritization parameter comprises a second prioritized bit rate, a second bucket size duration, or both.

28. The method of claim 19, wherein:

the plurality of radio link control entities are associated with respective importance levels of a plurality of importance levels associated with the first quality of service flow;

the first characteristics associated with the first protocol data unit set indicate that the first protocol data unit set is associated with a first importance level of the plurality of importance levels; and the second characteristics associated with the second protocol data unit set indicate that the second protocol data unit set is associated with a second importance level of the plurality of importance levels.

29. A user equipment (UE) for wireless communication, comprising:

means for establishing a configuration for a first quality of service flow, the configuration establishing a plurality of radio link control entities, wherein:

a first radio link control entity of the plurality of radio link control entities is associated with a first set of radio link control parameters of a plurality of sets of radio link control parameters, wherein the first radio link control entity is configured with the first set of radio link control parameters based at least in part on first characteristics associated with the first radio link control entity, and a second radio link control entity of the plurality of radio link control entities is associated with a second set of radio link control parameters of the plurality of sets of radio link control parameters, wherein the second radio link control entity is configured with the second set of radio link control parameters based at least in part on second characteristics associated with the second radio link control entity;

means for mapping protocol data units of a first protocol data unit set associated with the first quality of service flow to the first radio link control entity of the plurality of radio link control entities based at least in part on the first characteristics associated with the first protocol data unit set and the first radio link control entity;

means for mapping protocol data units of a second protocol data unit set associated with the first quality of service flow to the second radio link control entity of the plurality of radio link control entities based at least in part on the second characteristics associated with the second protocol data unit set and the second radio link control entity; and means for communicating at least a subset of the protocol data units of the first protocol data unit set, the second protocol data unit set, or both via one or more time-frequency resources based at least in part on the mapping.

30. A non-transitory computer-readable medium storing code for wireless communication at a wireless device, the code comprising instructions executable by one or more processors to:

establish a configuration for a first quality of service flow, the configuration establishing a plurality of radio link control entities, wherein:

a first radio link control entity of the plurality of radio link control entities is associated with a first set of radio link control parameters of a plurality of sets of radio link control parameters, wherein the first radio link control entity is configured with the first set of radio link control parameters based at least in part on first characteristics associated with the first radio link control entity, and a second radio link control entity of the plurality of radio link control entities is associated with a second set of radio link control parameters of the plurality of sets of radio link control parameters, wherein the second radio link control entity is configured with the second set of radio link control parameters based at least in part on second characteristics associated with the second radio link control entity;

map protocol data units of a first protocol data unit set associated with the first quality of service flow to the first radio link control entity of the plurality of radio link control entities based at least in part on the first characteristics associated with the first protocol data unit set and the first radio link control entity;

map protocol data units of a second protocol data unit set associated with the first quality of service flow to the second radio link control entity of the plurality of radio link control entities based at least in part on the second characteristics associated with the second protocol data unit set and the second radio link control entity; and communicate at least a subset of the protocol data units of the first protocol data unit set, the second protocol data unit set, or both via one or more time-frequency resources based at least in part on the mapping.

* * * * *